United States Patent [19]

Marble

[11] 4,173,843
[45] Nov. 13, 1979

[54] DECORATIVE ARTICLE

[76] Inventor: Orlin G. Marble, 1216 S. Garfield Ave., Alhambra, Calif. 91801

[21] Appl. No.: 905,801

[22] Filed: May 15, 1978

[51] Int. Cl.² ............................................. A01G 5/00
[52] U.S. Cl. .................................. 47/41 R; D11/143; D11/149; 428/16
[58] Field of Search .................................... 428/16–17, 428/35; 47/41 R, 41 G–41.13; D11/143, 149

[56] References Cited

U.S. PATENT DOCUMENTS 1,151,382   8/1915   Osborne ............................... 47/41 R Primary Examiner—Robert E. Bagwill
Attorney, Agent, or Firm—Sellers and Brace

[57] ABSTRACT

An article of manufacture useful as an attractive decorative object constructed to utilize the flower and leaves of the exotic bird of paradise flower to simulate the cuckoo-like road runner bird indigenous to South-Western U.S. desert areas. The V-shaped tubular main body is supported on legs fashioned like those of the road runner and its opposite ends are receptive of the stems of the paradise leaves and flower in a stance simulating the tail, wings and head of the road runner.

6 Claims, 4 Drawing Figures

U.S. Patent  Nov. 13, 1979  4,173,843
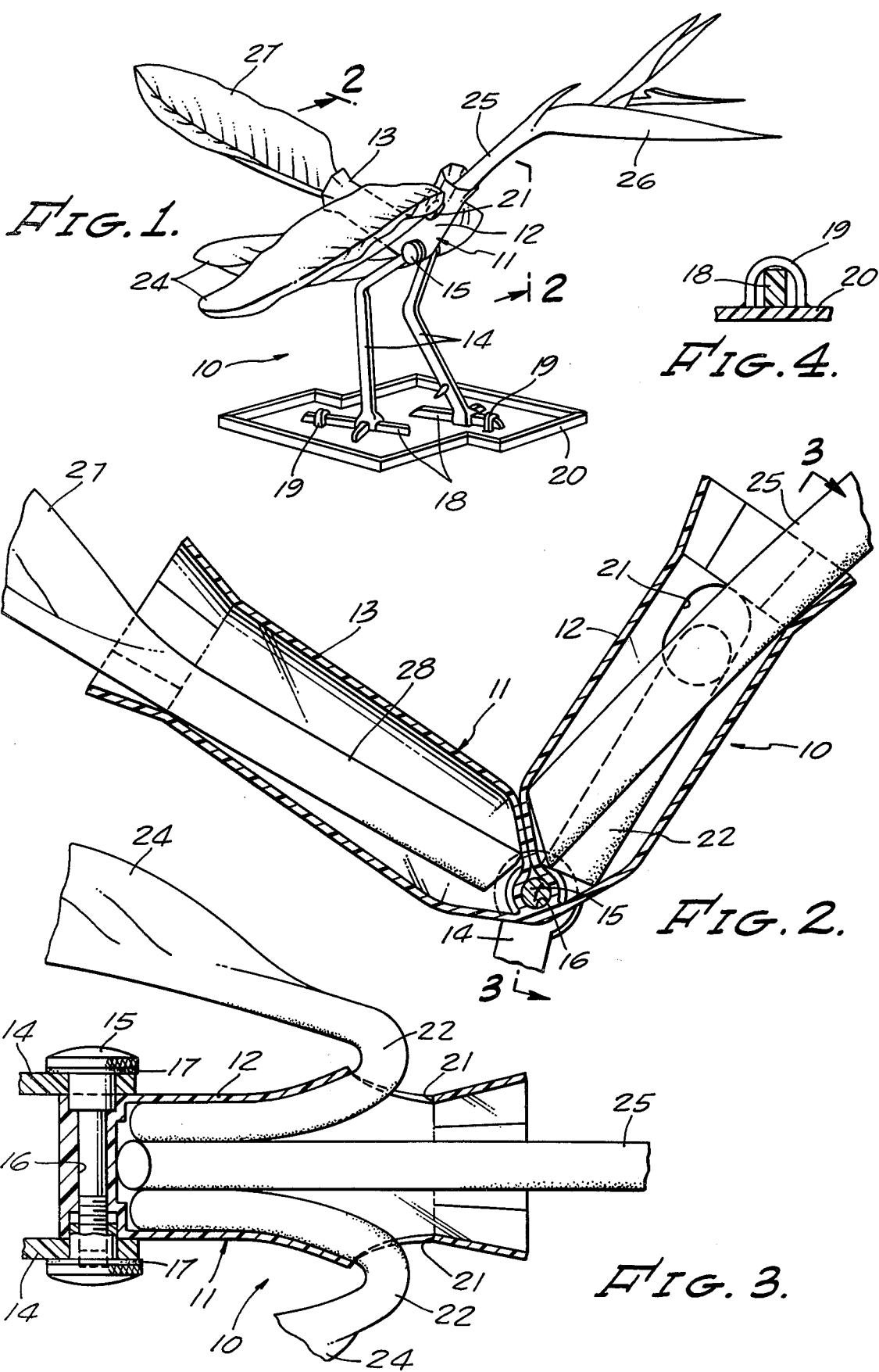

DECORATIVE ARTICLE

This invention relates to an articles of manufacture, and more particularly to a decorative object having a leg-supported tubular main body constructed to receive the leaves and blossom of the bird of paradise flower in a manner to simulate a road runner.

Inhabitants of and those familar with the desert areas of the South-Western U.S. are familar with the scarecrow-like road runner indigenous to this country's desert areas. The road runner is noted for its alertness, fleetness and the fact that it seldom flies except at sagebrush scaleing heights.

The ornamental article has a tubular main body supported on the characteristic long talon-equipped legs preferably anchorable to a base. The main body can be filled with water and supports the stems of the leaves and blossom of a bird of paradise flower so that the assembly presents a striking and dramatic resemblance to a road runner on a somewhat larger than full size scale.

It is therefore a primary object of the invention to provide a unique article of manufacture useful with components of the bird of paradise flower to simulate a road runner.

Another object of the invention is the provision of a decorative object designed to utilize the leaves and blossom of a bird of paradise flower to provide an unusual and attractive table centerpiece and colorful art object.

These and other more specific objects will appear upon reading the following specification and claims and upon consideration in connection therewith the attached drawing to which they relate.

Referring now to the drawing in which a preferred embodiment of the invention is illustrated:

FIG. 1 is a perspective view of an illustrative embodiment of the invention shown in use with leaves and blossom of a bird of paradise flower;

FIG. 2 is a fragmentary cross-sectional view on an enlarged scale taken along line 2—2 of FIG. 1;

FIG. 3 is a fragmentary cross-sectional view taken along line 3—3 of FIG. 2; and FIG. 4 is a fragmentary cross-sectional view on an enlarged scale taken through the anchorage for the talon-equipped legs as shown in FIG. 1.

Referring initially more particularly to FIG. 1, there is shown an illustrative embodiment of the art object embodying the features of this invention and designated generally 10. The object has a V-shaped tubular main body 11, the forwardly facing leg 12 being shown as somewhat shorter than the rearwardly facing leg 13. This main body is supported on a pair of legs 14, clamped to the opposite sides of its apex as by a threaded fastener 15 passing through a tubular passage 16 (FIGS. 2 and 3). The opposite knurled ends of fastener 15 preferably bear against a resilient washer 17 effective in frictionally clamping the legs and main body against relative movement when the fastener is properly tightened.

The lower ends of legs 14 are equipped with long talons 18. Preferably at least one talon of each leg is embraced by an anchorage loop 19 secured to a base such as the shallow tray 20.

The upper ends of each leg 12 and 13 of the main body are unobstructed and the rim portions may be slightly expanded and suitably shaped. Referring more particularly to FIG. 3, it will be noted that opposite lateral sides of the forwardly facing 12 of the main body bulges outwardly and is provided with openings 21,21 to receive the stems 22 of a leaf 24 representative of the road runner wings. Leg 12 is sufficiently large in diameter to also accommodate the stem 25 of a bird of paradise blossom 26. The long but sparse tail of the road runner is usually represented by a single leaf 27 of the bird of paradise flower with its stem 28 extending into and firmly seated in the main body leg 13. The upper surface of this leaf is preferably arranged to face upwardly whereas the wing simulating leaves 24 extend downwardly and rearwardly with their normal upper surface lying generally vertically and facing away from one another. Although not shown in the drawing, it will be understood that the legs of the main body are normally filled with water which is effective to maintain the blossom and leaves in a fresh lifelike manner for a week or longer.

All parts with the exception of the clamping fastener 15 may be formed from tough plastic material or any other suitable material. These components may be transparent or some or all may be suitably tinted or colored. The upturned perimeter of base 20 strengthens the base and provides a suitable protective retainer for water or drippings from the contents of the main body.

While the particular decorative article herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. An article of manufacture adapted to receive and support the leaves and flower of a bird of paradise plant in a manner simulating a road runner, said article comprising a generally V-shaped tubular main body supported from the apex thereof by a pair of talon-equipped end portion, one leg of said main body being adapted to receive the stem of a bird of paradise flower simulating the neck and head of a road runner, the other end portion of said main body being adapted to receive the stem of a bird of paradise leaf simulating the tail of a road runner, and said main body including provision for supporting the stems of a pair of paradise leaves extending downwardly and rearwardly along the opposite sides of said main body simulating the wings of a road runner.

2. An article of manufacture as defined in claim 1 characterized in the provision of means for holding said talon-equipped legs detachably assembled to said main body.

3. An article of manufacture as defined in claim 1 characterized in that said main body and said legs are formed substantially of non-metallic non-conductive material.

4. An article of manufacture as defined in claim 1 characterized in that the end portion of said main body adapted to receive the stem of a flower is provided with openings in the lateral sidewalls and adjacent the upper ends thereof to receive the stems of said leaves simulating the wings of a road runner.

5. An article of manufacture as defined in claim 1 characterized in the provision of a shallow tray having means in the upwardly facing side thereof adapted to interlock with a talon of said talon-equipped legs.

6. An article of manufacture as defined in claim 1 characterized in that a major portion of each end portion of said main body is adapted to contain water to nourish said flower and leaves.

* * * * *

UNITED STATES PATENT AND TRADEMARK OFFICE
CERTIFICATE OF CORRECTION

PATENT NO. : 4,173,843
DATED : November 13th, 1979
INVENTOR(S) : ORLIN G. MARBLE It is certified that error appears in the above-identified patent and that said Letters Patent are hereby corrected as shown below:

Claim 1, Column 2, line 36, after "talon-equipped" insert
-- legs, --.

Claim 1, Column 2, line 37, before "end portion" insert
-- one --.

Claim 1, Column 2, line 37, delete ", one leg".

Signed and Sealed this

Twelfth Day of May 1981

[SEAL]

Attest:

RENE D. TEGTMEYER

Attesting Officer	Acting Commissioner of Patents and Trademarks